US006541929B2

(12) United States Patent
Cregeur

(10) Patent No.: US 6,541,929 B2
(45) Date of Patent: Apr. 1, 2003

(54) APPARATUS AND METHOD FOR CONTROLLING VEHICLE POWER WINDOWS

(75) Inventor: Charles C. Cregeur, South Lyon, MI (US)

(73) Assignee: TRW Inc., Lyndhurst, OH (US)

( * ) Notice: Subject to any disclaimer, the term of this patent is extended or adjusted under 35 U.S.C. 154(b) by 60 days.

(21) Appl. No.: 09/777,039

(22) Filed: Feb. 5, 2001

(65) Prior Publication Data

US 2002/0105295 A1 Aug. 8, 2002

(51) Int. Cl.[7] .................................................. H02P 1/22

(52) U.S. Cl. ........................ 318/283; 318/282; 318/286; 318/446; 318/467; 318/487; 49/26; 49/28; 160/291; 160/293.1

(58) Field of Search ................................. 318/282, 283, 318/286, 446, 467, 265, 468, 487; 49/349, 28, 26; 160/291

(56) References Cited

U.S. PATENT DOCUMENTS

| | | | | | |
|---|---|---|---|---|---|
| 3,844,606 | A | * | 10/1974 | Hankison | 296/146.2 |
| 4,476,416 | A | | 10/1984 | Licata et al. | 318/283 |
| 4,678,975 | A | | 7/1987 | Vrabel et al. | 318/266 |
| 4,749,924 | A | | 6/1988 | Watanabe et al. | 318/474 |
| 4,864,153 | A | * | 9/1989 | McIntosh, Jr. | 307/10.1 |
| 4,870,333 | A | | 9/1989 | Itoh et al. | 318/286 |
| 4,887,263 | A | * | 12/1989 | Steely | 307/10.1 |
| 5,208,483 | A | | 5/1993 | Reneau | 307/10.1 |
| 5,406,270 | A | * | 4/1995 | Van Lente | 307/10.1 |
| 5,483,135 | A | | 1/1996 | Parks | 318/469 |
| 5,488,276 | A | | 1/1996 | Nishibe | 318/473 |
| 5,559,375 | A | * | 9/1996 | Jo et al. | 307/10.1 |
| 5,572,101 | A | | 11/1996 | Rutkowski et al. | 318/470 |
| 5,612,847 | A | * | 3/1997 | Malecke et al. | 307/10.1 |
| 5,616,997 | A | | 4/1997 | Jackson et al. | 318/467 |
| 5,698,907 | A | | 12/1997 | Weber | 307/10.1 |
| 5,746,444 | A | | 5/1998 | Foo et al. | 280/735 |
| 5,955,854 | A | * | 9/1999 | Zhang et al. | 318/264 |
| 6,097,105 | A | * | 8/2000 | Oikawa | 200/5 R |
| 6,215,201 | B1 | * | 4/2001 | Numata et al. | 307/10.1 |

OTHER PUBLICATIONS

Motor Trend (GMOT), V44, n7, p. 58–59, p2 Oldsmobile Cutlass Supreme Van Tune, C.*

* cited by examiner

*Primary Examiner*—Rita Leykin
(74) *Attorney, Agent, or Firm*—Tarolli, Sundheim, Covell, Tummino & Szabo L.L.P.

(57) ABSTRACT

A power window control apparatus for controlling vehicle power windows (12–18) includes window control switches (52–58) for controlling power window control motors (20–26). When two window control switches (52–58) are simultaneously and momentarily actuated downward, a controller (40) controls the motors (20–26) to lower the windows (12–18) to a predetermined position from an initially closed position. In the event that one or more windows are initially open, the controller (40) lowers the windows for the time interval that the two window control switches are actuated downward. When the two window control switches (52–58) are moved in the upward direction, the controller (40) simultaneously controls all the motors (20–26) to raise all open windows (12–18) to a fully closed position.

11 Claims, 2 Drawing Sheets

APPARATUS AND METHOD FOR CONTROLLING VEHICLE POWER WINDOWS

FIELD OF THE INVENTION

The present invention is directed to a power window control system and is particularly directed to an apparatus and method for controlling a plurality of power windows in response to actuation of window control switches.

BACKGROUND OF THE INVENTION

Known power window control systems raise and lower a vehicle window by energizing an associated motor in response to actuation of an associated window control switch. Each of the power windows of a vehicle have an associated control switch.

Other known power window control systems can move a selected window, e.g., driver's or front passenger's window, to a fully open position or a fully closed position in response to "one-touch" actuation of its associated window control switch. Such one-touch control systems respond to a single, relatively short actuation of a window control switch to continuously energize the associated window drive until the window is fully opened or fully closed. In such one-touch systems, the actuation switch returns to its inactive position through a spring bias return-to-center action, but the associated motor remains continuously energized until the window reaches its fully opened or fully closed position.

U.S. Pat. No. 4,476,416 discloses a one-touch control arrangement for power vehicle windows where a single touch of a single switch initiates movement of an associated window that continues even after release of the switch.

U.S. Pat. No. 5,572,101 discloses a power window system with a one-touch-open feature. The system is programmable to enable and/or disable the one-touch-down feature. The programming is done via a sequence of commands provided to a controller from the various window switches.

When parking a vehicle in-the sun during the summer, heat build-up within the vehicle cabin occurs very quickly. It is desirable to provide air flow when the vehicle is parked to reduce the cabin temperatures. It is desirable to be able to lower all vehicle windows to a predetermined position when parking the vehicle to permit increased air flow. It is also desirable to be able to close all vehicle windows when desired without having to control four separate window control switches.

SUMMARY OF THE INVENTION

The present invention provides a method and apparatus for raising and lowering vehicle windows. In accordance with one aspect, the present invention provides a power window control apparatus for controlling N vehicle power windows. The apparatus comprises N window control switches, each power window having an associated one of said N window control switches. The apparatus further includes a controller for simultaneously controlling said N vehicle power windows in response to simultaneous actuation of a plurality of less than N of said N window control switches.

In accordance with another aspect, the present invention provides a method for controlling N vehicle power windows that includes the step of controlling N vehicle power windows in response to a simultaneous actuation of a plurality of less than N window control switches.

BRIEF DESCRIPTION OF THE DRAWINGS

Further features and advantages of the present invention will become apparent to those skilled in the art from reading the following detailed description with reference to the accompanying drawings, in which.

DESCRIPTION OF AN EXEMPLARY EMBODIMENT

Figure 1:
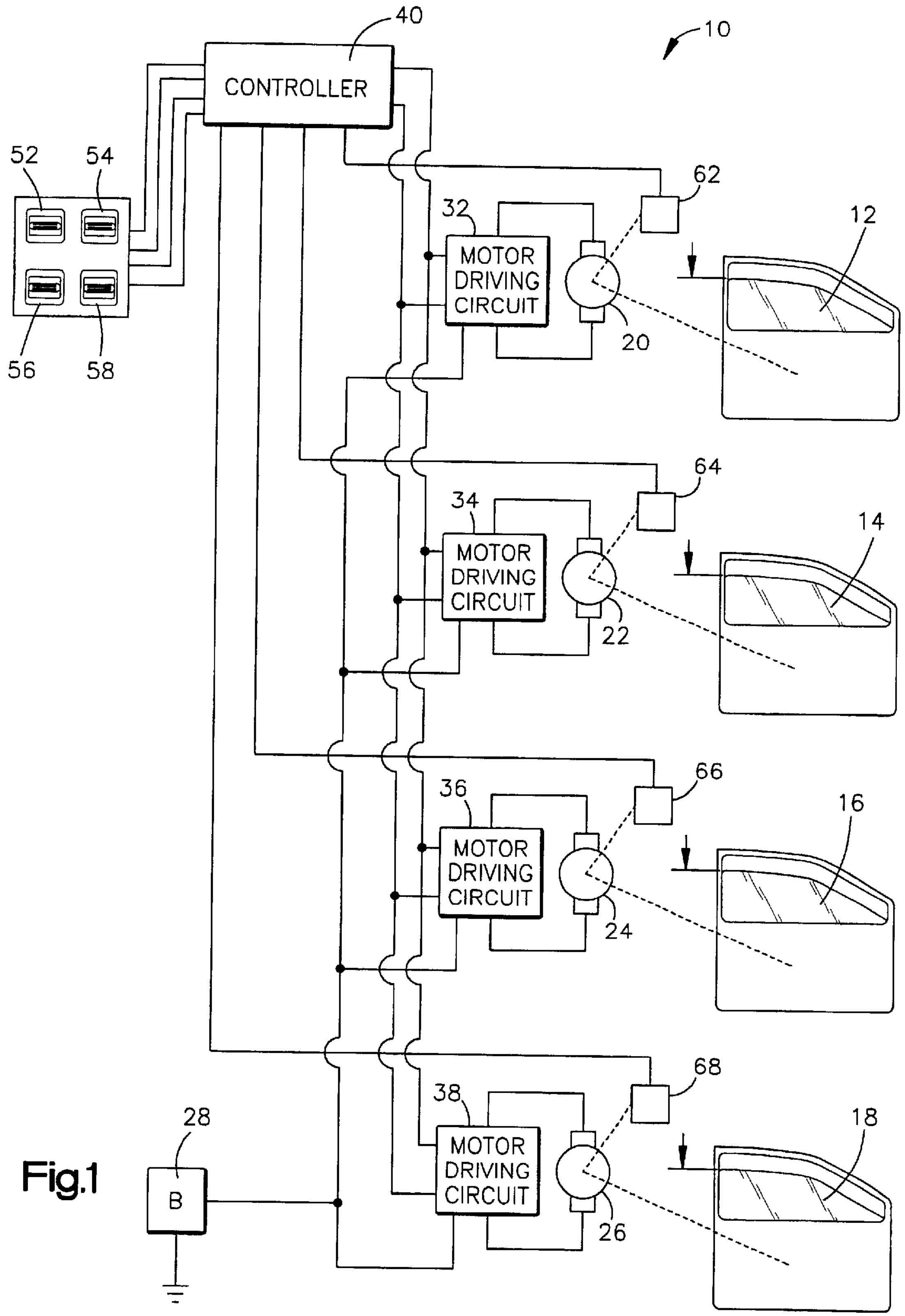
FIG. 1 is a schematic diagram of a vehicle power window control system in accordance with the present invention.

Referring to FIG. 1, a power window control system 10, in accordance with an exemplary embodiment of the present invention, controls the operation of vehicle windows 12, 14, 16, 18 via control of associated electric motors 20, 22, 24, 26, respectively. The electric motors 20–26 are drivingly connected to their associated vehicle windows 12–18, respectively, in a known manner, and are selectively energized from a vehicle battery 28 through associated drive circuitry 32, 34, 36, 38, respectively.

A controller 40 is controllably connected to each drive circuit 32–38 to control the drive circuits, and in turn, control energization of each associated motor 20–26, respectively. Each of the motors 20–26 can be driven in a forward and reverse direction. In one direction, a motor 20–26 drives its associated window 12–18 toward an open direction. In a second direction, a motor 20–26 drives its associated window 12–18 toward a close direction. The energization of and rotational direction of motors 20–26 is controlled by the controller 40 in response to operation of window control switches 52, 52, 56, and 58.

Each of the switches 52–58 is a double throw switch that has its lever spring biased to return to a center position. Actuation of one of the switches 52–58 in a first direction indicative of a desire to move its associated window toward an open position results in an associated motor 20–26 being driven by controller 40 through the associated drive circuit 32–38 to move the associated window toward an open position. Actuation of one of the switches 52–58 in a second direction indicative of a desire to move its associated window toward an closed position results in an associated motor 20–26 being driven by controller 40 through the associated drive circuit 32–38 to move the associated window toward a closed position.

Operation of the window control switches 52–58 provide input signals to the controller 40. The window control switches 52–58 may be mounted either on the driver's door or on the vehicle's center console or any other convenient location. Each window control switch is electrically connected to the controller 40. In response to actuation of one of the switches 52–58, the controller 40, through the associated motor drive circuit 32–38, energize the associated motor to move its associated window in the direction commensurate with the direction of switch actuation. The controller 40, in response to a one-touch actuation up (desired window closed direction) or down (desired window open direction) of one of the switches 52–58, energizes the associated motor 20–26 to drive its associated window to a fully closed or fully opened position, respectively. In response to momentary actuation of at least two of the switches 52–58 , in accordance with the present invention, the controller 40 lowers all the windows 12–18 to a predetermined opened position or raises all the windows to a fully closed position commensurate with the direction of simultaneous operation of the at least two switches. Momentary actuation or "one-touch" actuation means moving the switch or switches to an actuated position for a predetermined interval of time, such as for less than one second, and then release the switch or switches to return to center due to the spring bias force. As mentioned, each of the switches 52–58 are spring biased to a centered, non-actuated position. These types of return-to-center switches for power window control are well known in the art.

In accordance with an exemplary embodiment of the present invention, opening operation of the window in response to simultaneous actuation of two switches in an opening direction results in opening all windows 12–18 to a predetermined open position, e.g., one centimeter. Motor position sensors 62, 64, 66, and 68 are operatively connected to motors 20, 22, 24, 26, respectively, and to the controller 40 as input devices. Each of the sensors 62–68 provide an indication of the rotational motion of its associated motor 20–26. The controller 40 keeps track of the rotation of each motor and determines position of the associated window in response thereto. Alternatively, the sensors 62 could provide a signal indicative of the motor rotor position from a zero position and thereby indicate the position of its associated window. As a further alternative, window position sensors could be used for each power window to provide an indication to the controller 40 of the positional value of its associated window 12–18.

In accordance with one exemplary embodiment, the sensors 62–64 provide pulse signals indicative of motor shaft rotation to the controller 40. The controller 40 determines motor position from the encoder pulses using either a fully opened position or fully closed position as the point of reference. Window position could also be determined from motor velocity measurements or in any other known manner. Still yet another alternative is to energize a window drive motor for a predetermined time period starting from a fully opened or a fully closed position that would translate to movement to a predetermined distance, i.e., to a predetermined open position.

The controller 40 can be of any digital or analog type controller such as an application specific integrated circuit (ASIC), a microcomputer, a micro-controller, or a combination of suitable electronic components configured to provide a control process in accordance with the present invention.

In accordance with the present invention, assuming that all the windows are in an initial fully closed position, simultaneous momentary operation of two (any two) of the switches 52–58 in the downward (opening) direction results in the controller 40, through the drive circuits 32–38, energizing all motors 20–26 to move all the vehicle windows 12–18 toward an open position. The motors 20–26 remain energized to drive the windows 12–18 down to a predetermined open position, e.g., approximately one centimeter downward from the windows' 12–18 fully closed position. Such control would allow all window to easily be "slightly" opened to provide air ventilation as may be desired when parking the vehicle. Once each window 12–18 reaches the predetermined open position, the controller 40 stops each motor 20–26.

In the event that at least two window control switches 52–58 are actuated in the downward direction and one or more windows 12–18 are initially open, the controller 40 energizes all the motors 20–26 only while at least two window control switches 52–58 are held in an actuated condition. In effect, the driving the windows all to a predetermined open position in response to actuation of two of the window control switches requires that all the windows be initially in a fully closed position.

Also, in accordance with the present invention, if at least two window control switches 52–58 are enabled simultaneously and momentarily in the upward direction, the controller 40 would, through the motor driving circuits 32–38, energize each motor 20–26 to drive the windows 12–18 to a fully closed position regardless of each initial position of each of the motors.

Figure 2:
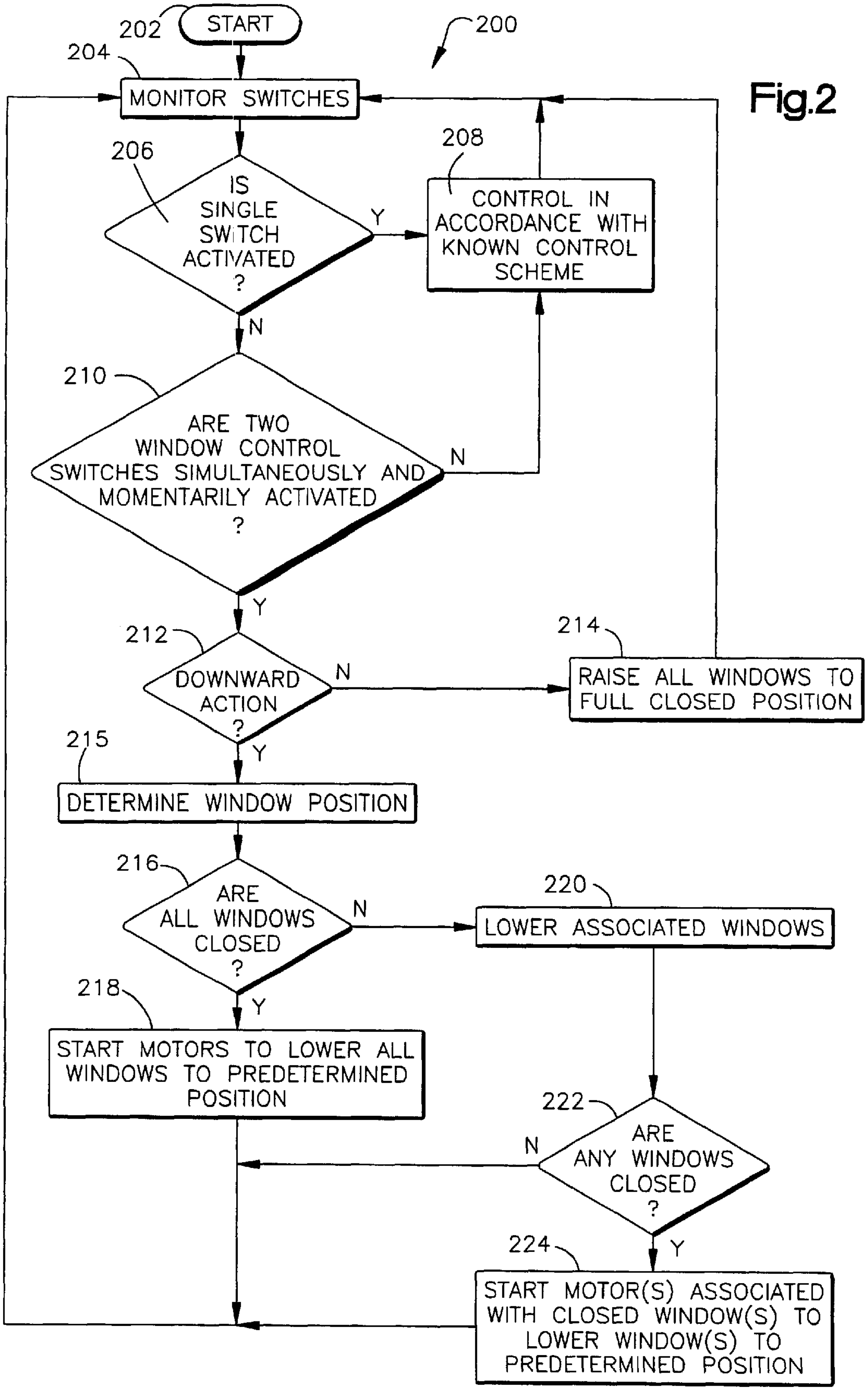
FIG. 2 is a flow chart diagram showing a power window control process in accordance with the present invention.

Referring to FIG. 2, a control process 200 in accordance with the present invention is used to control operation of power windows 12–18 in response to actuation of window control switches 52–58. The control process 200 begins at step 202 where memories are cleared, initial flag conditions are set, etc. Such program initiation would typically occur each time the vehicle is started. The process proceeds to step 204 where the window control switches are monitored. At step 206, the process determines whether only a single window control switch has been actuated. If the determination is affirmative, i.e., only one window control switch has been actuated, the process proceeds to step 208 where the associated window for the one actuated window control switch is controlled in accordance with any known control scheme. For example, the window could be driven up or down to commensurate with the time its associated window control switch is held actuated subject to the window not yet reaching the fully closed or opened position yet. If a single switch is momentarily actuated down or up, the associated window is drive fully opened or fully closed, respectively.

If the determination in step 206 is negative, i.e., more than one of the window control switches has been actuated, the process proceeds to step 210 where a determination is made as to whether two window control switches are simultaneously and momentarily actuated. If the determination in step 210 is negative, this means that either two window control switches are held actuated for more than a predetermined time or that three or more switches are either momentarily held actuated or continuously held actuated. If the determination 210 is negative, the process proceeds to step 208 where the controller controls the windows in accordance with known control schemes such as only driving the motors in the commensurate direction with their associated switch actuation for the time the switches are held actuated.

If the process in step 210 determines that two window control switches are simultaneously and momentarily actuated, the process proceeds to step 212. At step 212, the process determines if the two actuated window control switches were enabled in the downward direction (i.e., indicating a desire to open the vehicle windows). If the determination in step 212 is negative, this would indicate that two of the window control switches have been simultaneously and momentarily actuated in the upward direction, in turn, indicating a desire to close all the vehicle windows. From a negative determination in step 212, the process proceeds to step 214 where the controller actuates all window drive motors, each motor being driven for a time sufficient to close its associated window. After all windows are driven closed, the process would loop back to step 204. Those skilled in the art will appreciate that window closure could be achieved by other means other than controlling drive time such as stall detection by current monitoring.

If the determination in step 212 is affirmative thereby indicating a desire to lower all the vehicle windows, the process proceeds to step 215 where the controller determines the position of all the power windows. The process then proceeds to step 216 where it is determined whether all the vehicle's windows are presently in a fully closed position. In the event that all the windows are in the fully closed position (i.e., the determination in step 216 is affirmative), the process proceeds to step 218. At step 218, each motor for each power window is energized to drive its associated window to the predetermined position such as one centimeter open. From step 218, the process loops back to step 204.

If the determination at step 216 is negative, (i.e., the process determines that at least two window control switches are actuated in the downward position but not all of the vehicle windows are in a fully closed position), the process proceeds to step 220. At step 220, the controller energizes each window motor associated with the actuated switches to drive those associated windows in the downward direction. Each such window being opened is driven for the time interval equal to that time interval the at least two window control switches are actuated in the downward direction. From step 220, the process proceeds to step 222.

Provided that at least two window control switches are actuated in the downward position, at step 222, the process determines whether any of the vehicle's windows are in the closed position. If at least one of the windows are in the closed position (i.e., the determination in step 222 is affirmative), the process proceeds to step 224. At step 224, the controller energizes the motor of each closed window to lower those windows to the predetermined open position, e.g., one centimeter. From step 224 or from an negative determination in step 222, the process loops back to step 204.

In accordance with another embodiment of the present invention, in a vehicle having four power windows, momentary, simultaneous actuation of a first two control switches provide an all-window open control signal from controller 40 to open the windows to a predetermined open position if all windows are initially closed. A momentary, simultaneous actuation of the other two switches results in the controller closing all the windows.

From the above description of the invention, those skilled in the art will perceive improvements, changes and modifications. For example, a vehicle system having four power windows has been described. It should be appreciated that the present invention can be used in a vehicle having other numbers of power windows including three, four, five, etc. Such improvements, changes and modifications within the skill of the art are intended to be covered by the appended claims.

Having described the invention, the following is claimed:

1. A power window control apparatus for controlling N vehicle power windows, comprising:

N window control switches, each power window having an associated one of said N window control switches; and a controller for simultaneously controlling said N vehicle power windows in response to simultaneous actuation of a plurality of less than N of said N window control switches, wherein said controller includes means for controlling movement of said N windows to a predetermined position less than fully open from an initially closed position in response to the simultaneous actuation of said plurality of said less than N window control switches.

2. The apparatus of claim 1, wherein said control means lowers said N windows from the initially closed position to the predetermined position by controlling energization of each of said N power windows for a predetermined time interval wherein said predetermined time interval is different from a time of said simultaneous actuation of said plurality of said less than N of said window control switches.

3. The apparatus of claim 1 wherein said plurality of said less than N window control switches are actuated in a first direction to lower said N windows to said predetermined position and wherein said means for controlling raises said N windows in response to said simultaneous actuation of said plurality of said less than N window control switches in a second direction different from the first direction.

4. The apparatus of claim 1 wherein N equals four and the plurality of simultaneously actuated window control switches is two.

5. A power window control apparatus for controlling N vehicle power windows, comprising:

N window control switches, each power window having an associated window control switch; and a controller for:

(a) simultaneously lowering said N power windows to a predetermined position less than fully open in response to a simultaneous movement of a plurality of less than N of said N window control switches in a first direction, and (b) simultaneously raising said N power windows to a fully closed position in response to a simultaneous movement of a plurality of less than N of said N window control switches in a second direction.

6. The apparatus of claim 5 wherein said controller controls lowering said N power windows to the predetermined position by controlling energization of each of said N power windows for a predetermined time period wherein said predetermined time period is different from a time of said simultaneous actuation of said plurality of said less than N of said window control switches.

7. A method for controlling N vehicle power windows, comprising the steps of:

controlling N power windows in response to simultaneous actuation of a plurality of less than N window control switches; and moving said N windows to a predetermined position less than fully open from an initially closed position in response to the simultaneous actuation of said plurality of said less than N window control switches.

8. The method as set forth in claim 7, wherein said step of moving said N windows to a predetermined position less than fully open further includes the step of actuating said plurality of said less than N window control switches in a first direction, and wherein the method further includes the step of raising all N power windows to a fully closed position in response to said simultaneous movement of said plurality of said less than N window control switches in a second direction.

9. A method for controlling N vehicle power windows, comprising the steps of:

lowering the N power windows to a predetermined position less than fully open in response to a simultaneous movement of a plurality of less than N window control switches in a first direction; and raising N windows to a fully closed position in response to a simultaneous movement of said plurality of said less than N window control switches in a second direction.

10. A power window control apparatus for controlling N vehicle power windows, comprising:

N window control switches, each power window having an associated window control switch; and a controller for controlling movement of said N vehicle power windows, said controller, in response to simultaneous actuation of a plurality of less than N of said N window control switches for a period of time less than a predetermined threshold time, simultaneously controlling movement of said N vehicle power windows and, in response to simultaneous actuation of a plurality of less than N of said N window control switches for a period of time exceeding the predetermined threshold time, simultaneously controlling movement of only vehicle power windows associated with the actuated window control switches .

11. The apparatus of claim 10 wherein said controller includes means for controlling movement of said N vehicle power windows to a predetermined position less than fully open from an initially closed position in response to simultaneous actuation of a plurality of said less than N of said N window control switches for the period of time less than the predetermined threshold time.

* * * * *